Aug. 6, 1946.  H. B. HOLTHOUSE  2,405,144
HEATING SYSTEM
Filed March 3, 1943  3 Sheets-Sheet 1

Inventor:
Harry B. Holthouse
By Toonan L. Mueller
Atty.

Aug. 6, 1946.  H. B. HOLTHOUSE  2,405,144
HEATING SYSTEM
Filed March 3, 1943   3 Sheets-Sheet 2
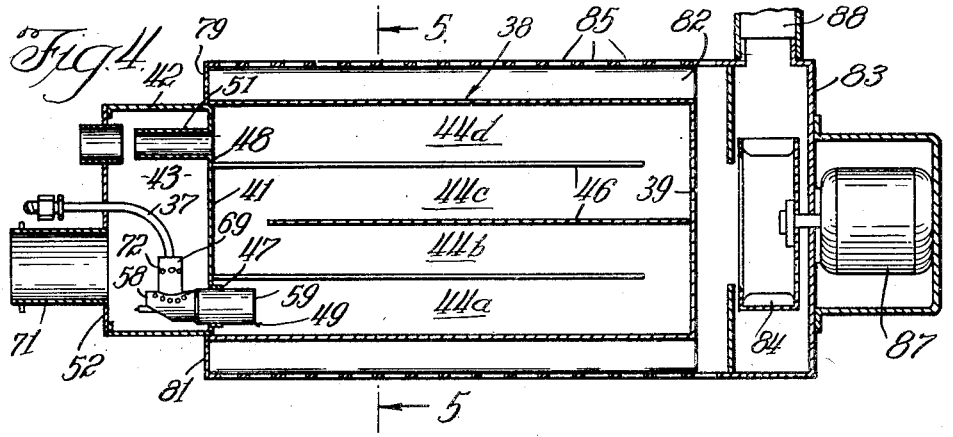
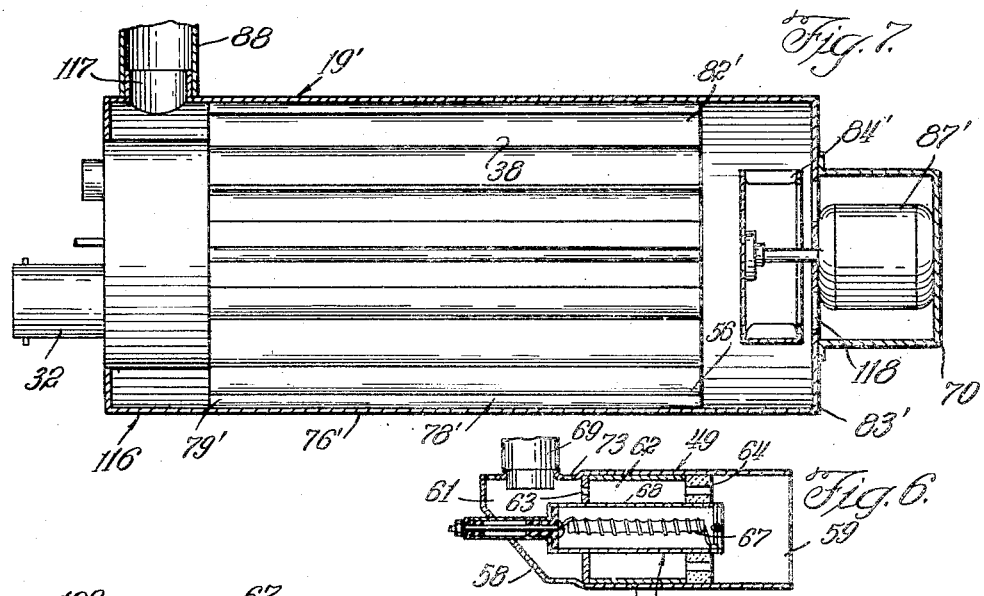
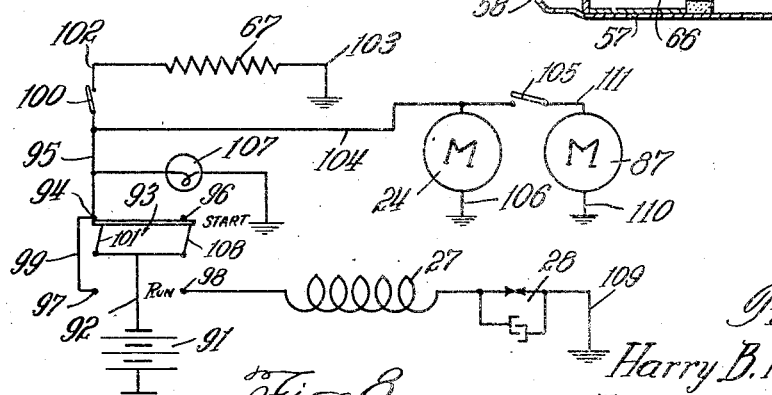
Inventor:
Harry B. Holthouse
By Norman L. Mueller
Atty.

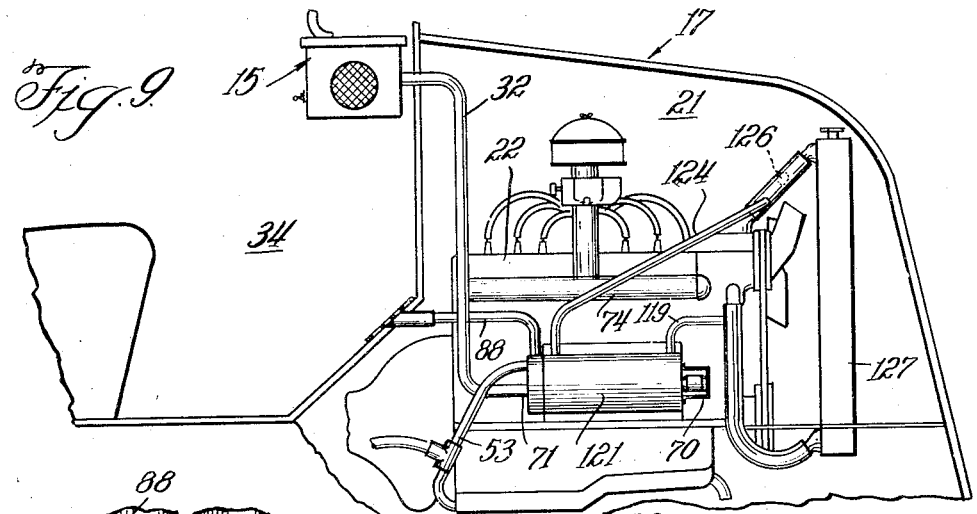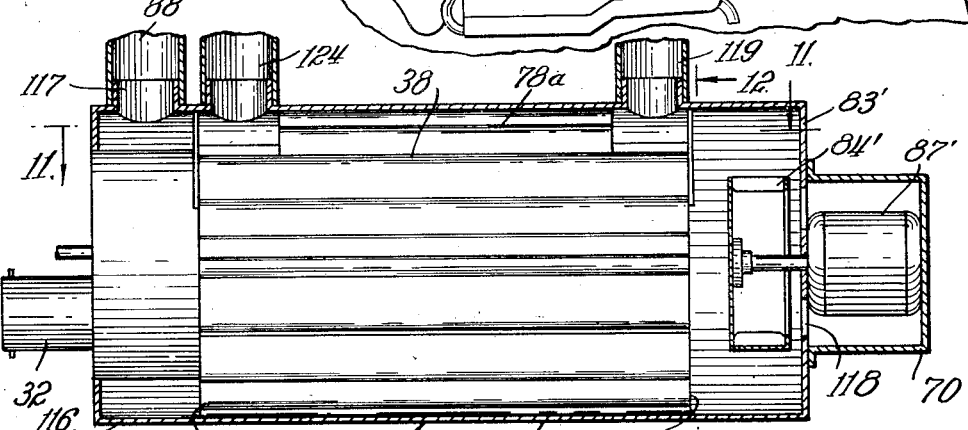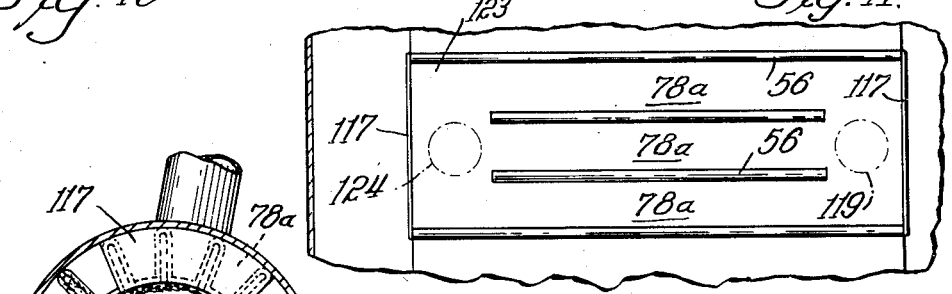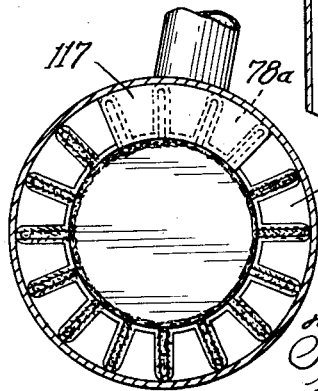

Patented Aug. 6, 1946

2,405,144

UNITED STATES PATENT OFFICE 2,405,144

HEATING SYSTEM

Harry B. Holthouse, Chicago, Ill., assignor to Galvin Manufacturing Corporation, Chicago, Ill., a corporation of Illinois Application March 3, 1943, Serial No. 477,813

9 Claims. (Cl. 237—1)

This invention relates generally to heating systems and in particular to a heating system for a mobile craft. Mobile craft is here intended to cover all apparatus adapted for movement on the ground, through the air or over water.

It is an object of this invention to provide an improved heating system.

Another object of this invention is to provide a heating system having a battery-operated heater for selectively heating a mobile craft engine or a space in the mobile craft, in which the heater operates with a reduced drain on the battery when the engine is being heated.

A further object of this invention is to provide a combination radiant and fluid heating battery-operated heater for a mobile craft capable of heating the craft engine with a lower drain on the battery than is required for normal craft heating purposes.

A further object of this invention is to provide a heating system for selectively heating a pair of separate spaces on a mobile craft, which is compact and rugged, uses the battery for the craft engine as the sole source of power supply, and is operable to efficiently and individually heat both of said spaces but with a reduced drain on the battery when one of said spaces is being heated.

Another object of this invention is to provide a single battery-operated heater for a mobile craft which operates with a smaller drain on the battery when used for heating the craft engine than is required for normal space heating in the mobile craft.

A feature of this invention is found in the provision of a heating system for a mobile craft in which a battery-operated heater of combustion type is located in the engine compartment and adapted to operate either as a radiant heater to heat the engine, or as an air heater to heat a space in the mobile craft, with the drain of the heater on the battery being reduced for its operation as a radiant heater.

Another feature of this invention is found in the provision of a heater for heating a mobile craft engine for starting purposes, which is capable of being carried on the engine below the engine intake manifold and operated as a radiant heater to heat the engine concurrently with its operation as a liquid heater to heat the engine cooling system.

Yet a further feature of this invention is found in the provision of a heating system for a mobile craft in which the exhaust gases from a battery-operated heater of combustion type are used in heating the craft engine and associated starting battery, which is also the sole source of power supply for the heater.

Further objects, features, advantages of this invention will become apparent from the following description when taken in connection with the accompanying drawings, in which:

Fig. 4 is a longitudinal sectional view of a heating or combustion unit used in the heating system of this invention, with the combustion chamber of the heating unit being shown in development;

Fig. 6 is an enlarged sectional detail view of a fuel conditioning means indicated generally in the heating unit shown in Fig. 4;

Fig. 7 shows another form of heating unit which is illustrated similarly to Fig. 4;

Fig. 8 is a diagrammatical control circuit used in the operation of the heating system of this invention and adapted for operation with either of the heating units shown in Figs. 4 and 7;

Fig. 9 is illustrated similarly to Fig. 1, and shows the heating system of this invention connected with a liquid cooling system for a mobile craft engine;

Fig. 10 is illustrated similarly to Fig. 7 and shows the application of the heating unit in Fig. 7 for heating the engine cooling system;

Fig. 11 is a fragmentary developed view as taken along the line 11—11 in Fig. 10; and Fig. 12 is a sectional view as seen along the line 12—12 in Fig. 10.

Figure 1:
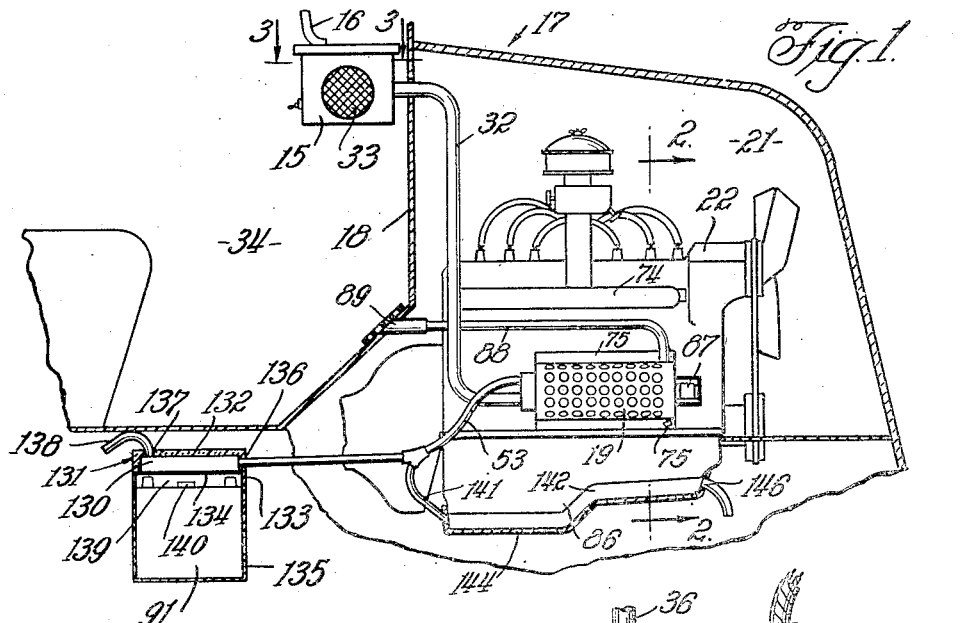
Fig. 1 illustrates the heating system of this invention applied to the heating of the engine and a space in an automobile.

Heating systems for a mobile craft are generally adapted to provide for a space heating in the craft, or for a heating of the motive power or engine for the craft. Many of the prior art space heaters for a mobile craft ordinarily use the motive power of the craft as a source of power supply so that these heaters are incapable of operation for stand-by heating purposes. When the starting battery for the engine is used as the sole source of power supply for the mobile craft heater, it is recognized that the effect of heater operation on the battery is less critical after the engine is in operation, as compared to its effect on the battery before the engine is started, due to the reduced load on the battery produced by the operating engine and the charging of the battery by the generator usually driven by the engine. Since the effective capacity of the starting battery is reduced at cold temperatures it is desirable that the drain on the battery by a heater to heat the engine for starting purposes be as low as possible. After the engine is heated and started, the heater load on the battery can be increased for other heating purposes without appreciably reducing the effective capacity of the battery for later use in starting the engine.

In the practice of this invention there is provided a heating system for an automobile adapted to heat the auto engine to facilitate its starting at cold temperatures, and to heat the passenger compartment or space in the automobile after the engine has been heated. The heating system includes a heater of combustion type which uses the engine starting battery as a sole source of power supply. The control unit for the heater is carried on the automobile dashboard and includes battery-operated means for supplying air and fuel to the heater which is supported on the engine below the engine intake manifold. The combustion chamber for the heater has a plurality of air passages about its periphery which are connected with the passenger compartment of the automobile, and open to the engine compartment or to the atmosphere. A battery-operated fan is used to move air through the air passages in a heat exchange relation with the combustion chamber and the heated air to the passenger compartment.

In the operation of the heating system to heat the automobile engine the air and fuel supply means only are operated and the heat generated in the heater combustion chamber is radiated through the air passages about the combustion chamber to the engine, to the engine compartment, and upwardly to the engine intake manifold. The means for supporting the heater on the engine are in thermal connection with the combustion chamber and with the engine so that further heat for heating the engine is conducted through these parts. To further aid in the heating of the engine some of the air passages about the combustion chamber are fluid sealed and connected into the engine cooling system. The water in these water passages, on being heated, produces a circulation of the liquid in the engine cooling system to provide for the passage of heated water through the engine. In order to use the heat from the heater to the fullest extent for engine starting purposes, the engine starting battery and the crank case are heated by the heater exhaust gases.

When it is desired to heat the passenger compartment in the automobile the fan for moving air through the air passages is operated to supply heated air into the passenger compartment. In heating the passenger compartment, therefore, the fan for circulating air about the heater and to the passenger compartment is operated concurrently with the air and fuel supply means for the heater while in the heating of the engine the fan remains idle or inoperative while only the air and fuel supply means are operated. As a result, the heater operates as a radiant heater for heating the engine, and as an air heater for heating the passenger compartment.

As shown in Fig. 1 the present invention includes a control unit 15 carried on the dashboard 16 of a vehicle 17 and to the operator's side of a fire wall 18. The control unit is operatively connected with a heater 19 located in a compartment 21 for the vehicle engine 22. The control unit 15 (Fig. 3) includes a housing 23 of a substantially rectangular shape which encloses a motor 24 having a blower or fan 25 carried on the motor shaft 26. A fuel pump 27, of solenoid type, is arranged in a substantially parallel relation with the motor and blower for a side by side assembly. Associated with the motor shaft 26 is a breaker assembly 28 arranged in the circuit of the pump 27 to control the operation of the pump, as will be later explained. The blower 25 has a scroll or casing 30 positioned within the housing 23 having an inlet opening 29 and an outlet opening 31 connected with a flexible conduit 32 which in turn is connected with the heating unit 19. Air is admitted into the housing 23 to the scroll inlet 29 through an opening 33 which connects the fan inlet 29 with the passenger compartment 34. The pump 27 has a feed line 36 connected with a fuel tank (not shown) and a discharge line 37 connected with the heating unit 19.

Figure 5:
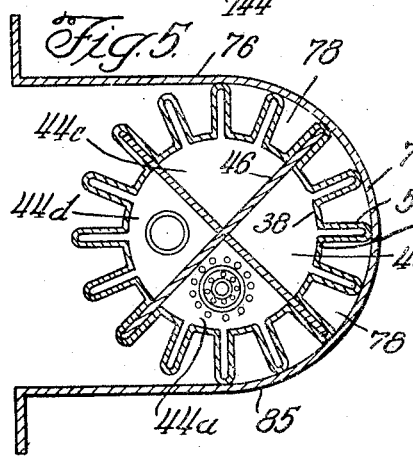
Fig. 5 is a cross sectional view of the heating unit taken along the line 5—5 in Fig. 4.

With reference to Figs. 4 and 5, the heating unit 19 is seen to include a combustion chamber 38, shown in Figs. 4 and 5, which is of a substantially cylindrical shape and closed at one end by a cover plate 39 and at its opposite end by the bottom 41 of a substantially cup-shaped member 42. The member 42 defines in part an air supply chamber 43 which is in axial alignment with the combustion chamber 38. The combustion chamber 38 is divided longitudinally into four axially extending but connected passages 44a—44d by a partition member 46 of substantially X-shape. The combustion chamber inlet 47 and outlet 48 are formed in the bottom portion 41 of the cup member 42 in communication with the passages 44a and 44d, respectively. Located within the inlet 47 is a fuel conditioning means, indicated generally as 49. The outlet 48 is connected with a tail or exhaust pipe assembly 51 extended into the air supply chamber 43 and then outwardly therefrom through an end plate or cover 52 for the air chamber 43. As shown in Fig. 1, the exhaust gases from the heater are directed to heat the engine starting battery 91 and crank case 86 as will be later explained.

The outer wall or body portion of the combustion chamber 38 (Fig. 5) is integrally formed with alternately arranged peripheral portions 54 and doubled fin portions 56 which are angularly spaced about and extended axially of the combustion chamber. The side portions of the partition member 46 are located within the inner open ends of certain ones of the fins 56 and retained within the fins in a fixed position relative to the combustion chamber body portion by welding or like means.

The fuel conditioning means 49, which was explained as being located in the inlet 47 of the combustion chamber 38 includes a tubular shaped housing member 57 having a substantially closed end portion 58 within the air supply chamber 43 and an open end portion 59 projected within the combustion passage 44a (Figs. 4 and 6). A mixing chamber 61, located at the closed end 58, is separated from an equalizing chamber 62 by a perforated heat conducting plate 63. The equalizing chamber 62 in turn is both defined and separated from the combustion chamber passage 44a by a perforated heat insulating plate 64. Extended substantially axially through the casing 57 is a combination heating and igniting unit 66 including a resistance coil 67 supported in a spaced relation within a heat conducting tube 68 composed of copper or like material. The casing 57 and partition 63 are also provided in a heat conducting material such as copper or the like and are in thermal connection with the combination unit 66 so as to readily receive heat therefrom. The combination unit 66 is adapted to heat the air and fuel mixing means 49 to at least a fuel vaporizing temperature to vaporize the fuel supplied thereto by the pump 27 for mixing together with the combustion air supplied by the blower 25, and to ignite such mixture for burning within the combustion chamber 38.

The fuel line 37 from the pump 27 is connected to an injection nozzle 69 supported on the casing 49 at the mixing chamber 61 and located within the air supply chamber 43. The air conduit 32 from the blower 25 is connected with a nipple 71 in the cover 52 for the air supply chamber 43 as by a bayonet and slot connection. A portion of the air from the air chamber 43 enters the nozzle 69 through ports 72 therein and travels with the fuel in the nozzle 69 into the mixing chamber 61. Further air is admitted directly into the mixing chamber 61 from the air supply chamber 43 through apertures 73 in the casing 49 and about the fuel nozzle 69. The fuel entering the mixing chamber is heated to at least a fuel vaporizing temperature by the electrical unit 66 for intimate mixing with the air in such chamber, with the heat from the electrical unit 66 being transferred to the casing 57 and the plate 63 in thermal connection therewith. This mixing of the air and fuel is facilitated by the turbulence of the air in the mixing chamber as produced by the blower 25. The mixture thus produced passes into the equalizing chamber 61 through the perforated plate 63, the equalizing chamber in conjunction with the insulating plate 64 functioning to retard the mixture flow through the conditioning unit 49 to reduce the turbulence of the mixture and to disperse the same substantially uniformly across the open end 59 of the casing 57. A mixture of substantially uniform fuel characteristics is thus provided at the outlet 59 for ignition by the combination unit 66 which functions as a heat gun. In other words, the heat developed by the coil 67 is projected outwardly from the copper tube 68, with the heat generated being dependent upon the watt input to the resistance coil 67. The mixture thus ignited is burned in the combustion chamber 38 with the exhaust gases being discharged through the pipe assembly 51 and exhaust conduit 53.

Figure 2:
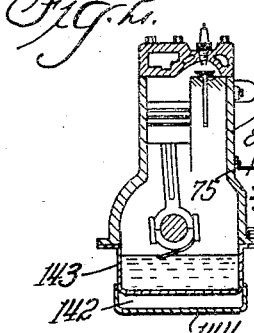
Fig. 2 is a reduced sectional view taken approximately along the line 2—2 in Fig. 1, showing the relative assembly of the combustion unit of the heating system with the automobile engine.

The heating unit 19 is supported on one side of the engine 22 and below the intake manifold 74 for the engine, with the supporting means (Figs. 1, 2, and 4) including a substantially U-shaped member 76 which is of a width coextensive in length with the combustion chamber 38. The leg portions of the U-member 76 are connected together by an arcuate portion 77 having a contour corresponding to the periphery of the combustion chamber 38 and adapted to be positioned about the outer ends of certain of the fin portions 56 to form a plurality of air passages 78 therewith. The ends of the legs of the U-member 76 are secured directly to the engine 22, as indicated at 75, with the fin portions 56 not connected with the member 76 being positioned within an air passage 80 defined by the engine 22, the legs of the U-member 76 and the combustion chamber 38. These air passages 78 and 80 are closed at one end 79 by a cover plate 81 and at their opposite ends 82 by a housing 83 for a fan 84, the housing 83 being open to the passages 78 and 80. The member 76 is of a metal construction and is thermally connected with the combustion chamber 38 through the fin portions 56 and with the engine 22, and is of a perforated construction to open the passages 78 and 80 with the engine compartment 21.

In the operation of the heating system to heat the engine 22, the pump 27 and fan 25 supply air and fuel to the heating unit 19 where it is acted upon by the combination unit 66 in the fuel conditioning means 49. The heat generated within the combustion chamber 38 is radiated outwardly therefrom through the fin portions 56 and the peripheral portions 54 and outwardly through the open U-member 76, with a portion of this radiated heat being applied directly to the engine 22 at the passage 80, another portion being radiated into the engine compartment 21, and a still further portion being radiated upwardly from the heating unit 19 to heat the intake manifold 74. Further heat is conducted to the engine 22 by virtue of the thermal connection of the U member 76 with the engine 22 and the heating unit 19. During the heating of the engine it is contemplated that the compartment 21 be suitably covered or otherwise substantially air sealed so that the heat radiated into the compartment 21 heats the compartment and in turn the engine 22. By virtue of the location of the heating unit 19 below the intake manifold 74, and in a position substantially above the level of the oil in the engine crank case 86 the radiated heat is efficiently applied to the main body portion of the engine 22 to loosen the lubricant on the mechanical parts herein, and to the intake manifold 74 to increase the temperature of the air and fuel mixture admitted into the engine 22 for burning.

As was previously mentioned, the effective capacity of a battery is greatly influenced by temperature conditions. Thus a fully charged battery retains its maximum capacity down to a temperature of about 30° F., but at temperatures below this value, and in the neighborhood of −10° F. to −20° F., its effective capacity is appreciably reduced by virtue of the increase in the internal resistance of the battery. Concurrently with the decrease in the effective capacity of the battery there is an increase in the power required to turn over the mobile craft engine due to the oil in the craft engine and the engine starting motor becoming stiff or less viscous. As a result a battery capable of efficiently starting a motor at a temperature of 30° F. is often incapable of starting, and at times of even turning over, an engine at a temperature below zero.

Mobile craft batteries are generally designed to have sufficient capacity to start an associated engine at temperatures above zero, but for temperatures below zero considerable difficulties are encountered in engine starting. It is apparent, of course, that any priming of the engine or heating of the carburetor or manifold of the engine is of little value in starting the engine, when the engine cannot be turned over or cranked at a suitable starting speed, or when an insufficient voltage is present in the starting coil in the engine ignition circuit. Battery tests as to amperage drain and resultant voltage under various temperature conditions are usually recorded at the battery terminals when the battery is shorted. The results thus obtained are not entirely accurate in indicating the effective capacity of the battery for starting the car engine since the circuit for the engine starting motor may require an amperage drain which greatly decreases the indicated amperage rating at the battery terminals, so that the indicated amperage rating does not give the true value of the total amperage drain required for starting. It often occurs, therefore, that although the indicated amperage rating at the battery terminals may be at a value indicating sufficient amperage for engine starting purposes, actually, due to the reduction in the effective capacity of the battery at cold temperatures, the battery voltage is incapable of forcing the required amperage for engine starting through the engine starting circuit. Thus when requirements on the battery are most severe, the battery is in a weakened condition and least able to handle the loads imposed thereon.

In order to overcome these battery difficulties the engine battery 91 is heated concurrently with the engine 22 by means of the exhaust gases from the heating unit 19. As shown in Fig. 1, an exhaust conduit 53 is connected with the exhaust pipe assembly 51 and with a chamber 130 formed in a box-like cover 131 for the battery 91. The chamber 130 is defined by an insulated top 132, insulated side portions 133 and a metal bottom plate 134 carried on the side portions 133 and is adapted to fit over an insulated casing or housing 135 for the battery 91 such that the bottom metal plate 134 is spaced a relatively small distance from the top of the battery 91. The exhaust conduit 53 is connected with an inlet 136 to the chamber 130, with the exhaust gases, after passing through the chamber, being discharged through an outlet 137 to the atmosphere through a conduit 138.

The exhaust gases in passing through the chamber 130 heat the metal plate 134 which functions as a heat-radiating surface to radiate heat over the top of the battery 91. The battery 91 fits closely within the housing 135 so that all of the heat radiated from the metal plate 134 is confined at the top of the battery 91 and within the space or chamber 139. The usual storage battery has a casing composed of a hard rubber or like material having poor heat conducting characteristics, so that this casing functions as a heat insulator relative to the inner parts of the battery. As a result, any heat applied about the battery has little or no effect in raising the temperature of the electrolyte or plates within the battery.

However, the usual storage battery includes terminal portions and straps 140, generally comprised of a lead material, for connecting the battery cells. These terminals straps are of a relatively large size to reduce their electrical resistivity and in turn increase the conductivity of these parts to carry electrical current. Besides acting as an electrical conductor, the terminals straps are heat conducting and in thermal connection with the battery plates from which heat is radially transferred to the battery electrolyte. By applying heat directly to the terminals and straps, the applied heat is used to its fullest extent in increasing the temperature of the battery. In tests it has been found that the battery temperature has been increased from 15° F. to 20° F. within a matter of five minutes from temperatures of —20° F. and lower. The heat radiated from the metal plate 134 by virtue of acting directly on the terminals and straps increases the temperature of the battery 91 in a minimum of time to a temperature at which substantially its maximum effective capacity is available for engine starting purposes.

As explained above in the operation of the heating unit 19 as a heat radiator, heat is applied to the engine frame and to the intake manifold 74 to heat the engine frame and in turn the mechanical lubricated parts therein concurrently with the mixture to be burned in the engine. It is appreciated, of course, that although the heating of the lubricated engine parts such as the pistons, valves, and the like, facilitates engine starting, the operation of the engine after starting can be maintained only if the supply of oil in the engine crank case 86 is capable of being forced through these engine parts to replace the initial lubrication. In other words, if the oil in the crank case is so stiff that it will not readily flow or its function for lubricating is appreciably reduced, the continued operation of the engine after starting will result in considerable damage or burning out of the engine.

To provide for the continued operation of the engine after starting, the exhaust conduit 53 from the heating unit 19 is connected with a conduit 141 to carry exhaust gases from the heating unit into a duct 142 formed about the engine crank case 86. The duct 142 is defined by a crank case cover 143 and a mating plate portion 144 positioned below the crank cover 143 but in a spaced relation therewith. The exhaust gases in the conduit 141 enter at one end of the duct 142 and are discharged from the opposite end 146 of the duct into the atmosphere. In the operation of the heating unit 19 as a radiating unit, therefore, the engine 22, engine compartment 21, engine lubrication system, and the intake manifold 74 are heated concurrently with the heating of the battery 91, so that both the engine and the battery are at temperatures which provide the best starting conditions for the engine 22.

If it is desired to heat the passenger compartment 34 it is only necessary to operate the motor 87 to drive the fan 84, the motor 87 being carried on the fan housing 83. The fan 84 draws air from the engine compartment 21 through the openings or perforations 85 in the U-shaped member 76 into the passages 78 and 80 to be heated by the heat radiating fin portions 56. The air thus heated is drawn into the fan housing 83 and discharged by the fan 84 into a conduit 88 connected with a heated air inlet 89 open to the passenger compartment 34. It is seen, therefore, that prior to the operation of the fan 84 the heater 19 radiates heat to the heat compartment 21 and engine 22, and then on operation of the fan 84 air is drawn from the compartment 21 in a heat exchange relation with the heater 19 and the heated air projected into the passenger compartment 34. Thus for engine heating the heat is radiated to the engine and for heating of the passenger compartment air is heated and circulated through the heater and the heated air moved to the passenger space. A control circuit providing for the selective operation of the heating system to heat either the engine 19 or the passenger space 34 is shown in Fig. 8.

With reference to Fig. 8 the control circuit includes a storage battery 91, which is also the starting battery for the engine 22, connected through a feed line 92 with a double-throw double-pole switch 93 having corresponding pairs of terminals 94 and 96, and 97 and 98, with the terminals 94 and 97 being connected together by a conductor 99. The circuit for the resistance coil 67, when the switch is in its "start" position, includes from the battery 91, the feed line 92, contact arm 101 of the switch 93, terminal 94, conductors 95 and 102, the resistance coil 67, and a ground connection 103. The circuit for the motor 24 from the battery 91, for heater starting, is common with that of the resistance coil 67 up through the conductor 95 and then includes additionally conductor 104, the motor 24, and a ground connection 106. The circuit of the motor 24 for normal heater operation, that is when the switch 93 is in the "run" position indicated in Fig. 8, includes from the contact arm 101 the terminal 97, conductor 99, and terminal 94, conductors 95 and 104, the motor 24, and the ground connection 106. The circuit for the resistance element 67 is also closed when the switch 93 is in a "run" position, this circuit being common with the motor 24 up through the conductor 95. A switch 100 in the conductor 101 controls the operation of the resistance 67 independently of the switch 93. A light 107 connected from the conductor 95 to ground visually indicates a closed position of the switch 93 at either the "start" or "run" position thereof.

The circuit for the pump 27 for normal heater operation includes from the feed line 92 the switch arm 108, terminal 98, pump 27, breaker assembly 28, and a ground connection 109. The air circulating motor 87 is connected in parallel with the motor 24 by a conductor 111 connected with the conductor 104 and a ground connection 110, but is operated independently of the motor 24 by means of a switch 105 in the conductor 111. It is seen, therefore, that with the switch 100 closed, and the switch 105 in an open position movement of the switch 93 to its "start" position closes the circuits for the motor 24 and resistance coil 67, and when moved to its "run" position closes the circuits for the resistance 67, the motor 24, and fuel pump 27. This action of the double-throw switch 93 providing for only the motor 24 and the resistance coil 67 being operated when the heater is started assures an initial burning up of any residual fuel in the heater prior to the admission of additional or new fuel by the pump 27. Also the resistance coil 67 may be heated to an optimum temperature before any fuel is fed to the heater for burning so that the new fuel is completely vaporized and efficiently burned.

Figure 3:
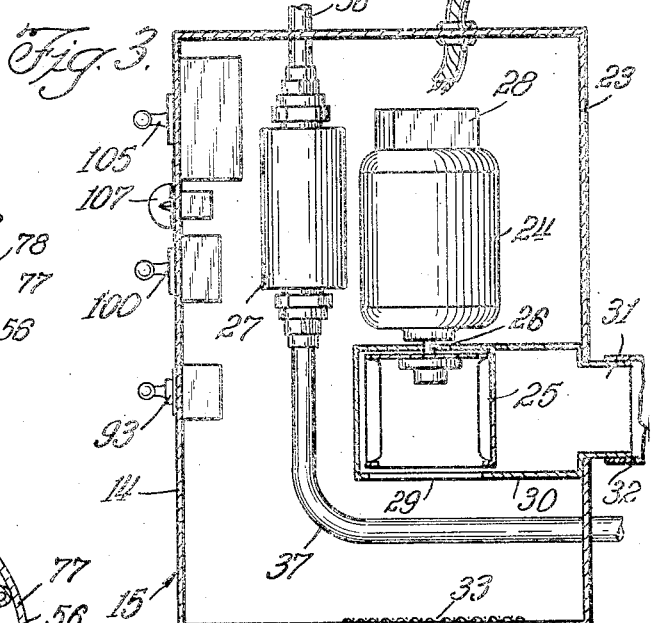
Fig. 3 is a sectional plan view of the control unit for the heating system of this invention as seen approximately along the line 3—3 in Fig. 1.

After the conditioning unit 49 has been heated to a substantially fuel vaporizing temperature by the resistance coil 67 the switch 93 is moved to its "run" position to provide for the supply of both air and fuel to the conditioning means 49. On a starting of combustion the switch 100 is opened to deenergize the resistance 67, while the switch 93 is retained in a "run" position. By virtue of the heat from the combustion chamber 38 being transferred to the conditioning means 49, the conditioning means is retained at a fuel vaporizing temperature so as to continue to thoroughly mix the air and fuel supplied thereto. The resistance coil 67, therefore, when the heating unit 19 is operating as a radiant heater is energized only long enough to start combustion so that only the pump and motor are operated during a normal operation of the heater. To operate the heater 19 as an air heating unit it is only necessary, after the switch 93 is in a "run" position, to close the switch 105 to operate the fan motor 87. As shown in Fig. 3 the switches 93, 105, and 100 are conveniently carried on the control panel 14 of the control unit 15 for easy manipulation by the operator of the vehicle 17, with the light 107 being visibly supported adjacent these switches.

In one commercial embodiment of the invention, when using a battery 91 having a capacity of about 12 volts, the starting current of the heater on the battery is in the neighborhood of seven amperes comprised of a load of about 1.4 amperes for the motor 24 and a load of approximately five amperes for the resistance coil 67. After burning has been initiated and the resistance coil 67 cut out, by operation of the switch 100, the current demand or drain on the battery 91 is reduced to around three amperes, and varies between 1.3 amperes and 3 amperes due to the current surges created in the operating circuit by the cutting in and out of the pump 27 by the circuit breaker 28. It is seen, therefore, that the motor 24 draws 1.3 amperes, the pump about 1.5 amperes for each make of the circuit breaker 28, and the coil 67 about five amperes. The current drain of 1.3 amperes for the motor operates the fan 24 at about 4800 R. P. M. with a discharge capacity of about 20 cubic feet per minute. The fan creates a pressure in the air supply chamber 43 of about two inches of water, and since this pressure alone acts on the combustion chamber burning takes place at substantially atmospheric pressure.

As mentioned above, the pump 27 draws about 1.5 amperes for each make of the circuit breaker 28. This make occurs at the rate of about thirty times a minute and has a duration of about $\frac{1}{10}$ of a second. Because of this intermittent operation of the pump 27 its average steady current demand on the battery is only about $\frac{1}{10}$ of an ampere and not 1.5 amperes. Since the motor demand is 1.3 amperes it is seen that the average continuous drain on the battery 91 during normal heater operation, that is after combustion has been initially started, is only about 1.4 amperes. When used with a battery having, for example, a rating of 200 ampere hours the heater when operating as a radiant heater, is capable of being efficiently and continuously operated for about 145 hours. Also because of this low current demand, as a result of which the heater is capable of being operated at an effective capacity far below that required for engine starting puproses, and the heating of the battery by the engine exhaust gases a greater amount of the battery charge is recovered from the warm battery than when a relatively heavy current drain is imposed on a cold battery. The battery charge, therefore, is utilized to its fullest extent so that continuous heater operation from the single battery is greatly increased. Further, for relatively short periods of engine and battery heating, such as ten or twelve hours, the effective capacity of the battery is only slightly reduced so as not to interfere with the ability of the battery to later satisfactorily handle high current loads.

In the operation of the heating unit 19, with the current demand as explained above, there is generated a rated heat output of about 13,000 B. t. u.'s (British thermal units) per hour. With an average drain of 1.4 amperes for the motor 24 and pump 27 at a pressure of twelve volts the battery power expended is about 16.8 watts.

Assuming this power to be continued for one hour, during which time the heater generates 13,000 B. t. u.'s, it is seen that the heating unit 19 produces about 800 B. t. u.'s per watt hour when operating as a radiant heater. This heat rating does not include the heat available from the heater exhaust gases. Thus a large amount of heat is obtained from a very small amount of electrical energy so that apart from the heater being capable of a prolonged and continuous operation, it is capable also of a high heat output. Also, in the embodiment mentioned above, the heater has an overall length of about 15", and a cross sectional dimension of about 6", so that it is readily and conveniently carried on the engine 22 and easily located adjacent any portion thereof, such as the intake manifold 74, which might require more heat than other portions to facilitate a quick starting of the engine.

Since the effective capacity of the battery is reduced with cold temperatures it is desirable that the engine be in the best condition possible for starting purposes before a starting load is applied on the battery. In other words a battery with a reduced effective capacity or charge, is quickly drawn or run down by a high current load. However, when the engine and battery are heated, the starting conditions of the engine and battery approximate normal temperature operating conditions so that only a short use of the battery is required for engine starting purposes with the load during such short use being less than the starting load of a cold engine. By virtue of the low drain of the heater 19 on the battery 91, as above explained, its operation may be continued over a period of time sufficient to heat the engine 22 and battery 91 without appreciably reducing the initial effective capacity of the battery 91.

After the engine 22 is in operation and it is desired to heat the passenger space 34 the switch 105 (Fig. 8), is closed to operate the fan 84. The fan 84, in the same embodiment previously referred to, produces a current drain on the battery 91 of about three amperes so that during the operation of the heater to heat air for delivery to the passenger space 34, the normal drain on the battery is about 4.4 amperes. However, since the current drain of the engine on the battery is only that required for the engine ignition system, and with the battery being charged concurrently with engine operation by the usual engine-operated generator, this additional current drain by the heater 19 on the battery 91 is still relatively small and well within the factor of safety for long continuous operation without appreciably reducing the effective capacity of the battery.

In Fig. 7 there is illustrated a heating unit 19' which is similar in all respects to the heating unit 19 shown in Fig. 4 except that it provides for a pressure circulation of air about the combustion chamber 38 rather than a suction circulation of air as shown in Fig. 4. In the heating unit 19' the combustion chamber 38, air supply chamber 43, fuel conditioning means 49, and fins 56 are constructed and assembled similarly to that described for the heating unit 19' in Fig. 4. The U-shaped bracket 76' for supporting the heater 19' on the engine 22 is similar to the U-shaped bracket 76 for supporting the heating unit 19' except that it is of a solid construction, so that the air passages 78' formed between adjacent fins 56 by the arcuate portion of the U-shaped member 76' are open only at corresponding opposite ends. At the passage ends 79' there is provided an air heater or manifold 116 which is open to all of the air passages 78' and the air passage (not shown) corresponding to the passage 80 for the unit 19 shown in Fig. 2. The header 116 has an outlet portion 117 connected with the conduit 88 for carrying heated air through the inlet 89 into the passenger space 34. The ends 82' of the air passages open into a housing 83' for a pressure fan 84' having an associated driving motor 87' supported on a spider frame 70 carried on the housing 83'.

In the operation of the heating unit 19' as a radiant heater the heat generated within the combustion chamber 38 is radiated outwardly therefrom through the fins 56 and U-shaped member 76' which is in thermal connection with the fins and with the engine 22. With the U member 76' acting as a radiating surface, heat is radiated into the compartment 21 and upwardly to the intake manifold 74, with further heat being radiated and conducted directly to the frame of the engine 22 for transmission to the operating parts therein. The control circuit of Fig. 8 is applicable to the operation of the heater 19' in a manner which is believed to be apparent so that a description of this circuit relative to the heater 19' in Fig. 7 is believed to be unnecessary.

In order to operate the heater 19' to heat the passenger space 34 the switch 105 (Fig. 8) is closed to operate the motor 87', and in turn the fan 84', which draws air from the engine compartment 21 through the inlet 118 into the fan housing 83'. This air is then forced through the air passages 78' and the passage (not shown) defined by the member 76', the combustion chamber 38 and engine 22 and corresponding to the passage 80 shown in Fig. 2, in a heat exchange relation with the heat radiating fins 56. The heated air passes into the manifold 116 from where it is discharged through the outlet 117 into the conduit 88 for admission into the passenger space 34 at the inlet 89. It is to be understood, of course, that the inlet 118 in the fan housing 83' may be connected to receive air from outside the engine compartment 21, or may be connected with the passenger space 34 to provide a recirculated air heating system for such space.

To further aid in the heating of the engine 22 for starting purposes a heater 121 is shown in Figs. 9 and 10 as applied to the heating of a liquid cooling system for the engine 22. The heating unit 121 is similar in all respects to the heating unit 19' in Fig. 7 except for certain of the air passages being liquid sealed and connected into the engine cooling system. As shown in Figs. 11 and 12 three passages formed between the bracket supporting member 76' and the radiating fin portions 56 and indicated as 78a are liquid sealed and connected together by merely shortening the fins 56 defining the intermediate liquid passage of the three liquid passages 78a, and by closing the corresponding ends of the three passages by sealing plates 117 in a manner clearly indicated in Figs. 11 and 12. The water passages 78a are connected at one end with a conduit 119, which in turn is connected with the chamber of the usual liquid pump (not shown) for the engine 22. The opposite end 123 of the water passages 78a is connected with a conduit 124 which in turn is connected into the engine cooling system at a point adjacent a water thermostat 126 but in a position relative to such thermostat so as to form a closed circulating system with the conduit 119 when the thermostat 126 is closed. The thermostat 126 is of a usual type for admitting liquid into the engine radiator 127 only after such liquid has been heated to a predetermined temperature.

On operation of the heating unit 121 to heat the engine 22 the liquid heated in the passages 78a sets up a thermal circulation of the liquid in the engine cooling system so that such liquid flows through the engine 22 in a direction indicated generally by the arrows in Fig. 9. Thus the temperature of the liquid in the engine cooling system is increased simultaneously with the heating of the engine compartment 21, air intake manifold 74, and the engine 22 and since this heating takes place inwardly of the engine the temperature of the engine 22 as a whole is increased more uniformly and rapidly than when heat is applied only to the outside thereof.

The heating unit 121 is operated to heat the passenger space 34 in all ways similar to the heating unit 19' shown in Fig. 7 so that a further description of the operation thereof is believed to be unnecessary. The control circuit in Fig. 8 is also applicable to the heating unit 121. Although the passages 78a remain connected in the engine cooling system when the heating unit 121 is operated to heat the space 34, the heating of the liquid in such passages is without any effect on engine operation because of the heating of the liquid in the cooling system resulting from normal engine operation.

From a consideration of the above description and drawings, therefore, it is seen that the invention provides a combination radiant heater and air heating unit for a mobile craft which is capable of selectively heating either the craft engine or a space or passenger compartment within the mobile craft, with the heating of the engine taking place with a reduced drain of the heater on the starting battery for the craft engine and concurrently with a heating of the starting battery. The overall system is very compact, and easily operated by virtue of a control unit being conveniently located in a position for easy manipulation by the operator for the mobile craft. The heating unit in the heating system is of a small size so that it is conveniently assembled on the craft engine at any position where it can be used most advantageously to heat the engine for starting purposes. When operating as a radiant heater to heat the mobile craft engine the heater operates with a relatively high heat output and a very low current drain on the engine starting battery so that this operation can be maintained continuously and over a long period of time without appreciably reducing the effective capacity of the battery. Although the heating system operates with a slightly increased current drain on the battery when the passenger compartment is being heated, such drain is relatively small and is well within all factors of safety for a continued long operation of the heater without effecting a quick drain on the car battery. The heating system is thus capable of operating efficiently at cold temperatures to heat the engine by radiant heat or to heat the passenger space by circulated heated air.

Although the invention has been specifically described and illustrated with respect to several preferred embodiments thereof it is to be understood that it is not to be so limited since modifications and alterations can be made therein which are within the intended scope of this invention as defined by the appended claims.

I claim:

1. In a heating system for a mobile craft having a space to be heated, an engine provided with an intake manifold, and a compartment for said engine, the means providing for the selective heating of said engine and space including in combination a heater of combustion type comprising means defining a combustion chamber having heat radiating portions projecting from the sides thereof, means for supporting said heater on one side of said engine and below said intake manifold, said supporting means having a part extended about certain of said heat radiating portions to form air passages therewith about said combustion chamber and having another part cooperating with said one engine side to form a passage having the remaining heat radiating portions therein, said supporting means having openings therein connecting said passages with said compartment so that the heat generated in said combustion chamber is radiated to said compartment, to said engine and upwardly to said intake manifold, electrically operated fuel and air supply means providing for fuel combustion within said combustion chamber, means including selectively operable air moving means for moving air from said compartment through said passage openings in heat exchange relation with said radiating portions and for delivering said heated air to said space.

2. In a heating system for apparatus having a space to be heated and a compartment for a liquid cooled engine including an intake manifold, the means for selectively heating said engine to improve its starting at cold temperatures and said space after said engine has started including a combustion type heater provided with means defining a combustion chamber, means disposed about a portion of said combustion chamber for carrying a liquid in heat exchange relation with said combustion chamber, heat radiating portions projecting from the remaining portions of said combustion chamber means, means supporting said heater on said engine below said air intake manifold including a part extended about said heat radiating portions to form air passages therewith about said combustion chamber, liquid passage means in said engine connected with the liquid carrying means in said heater, means for supplying fuel and air to said combustion chamber for combustion, thereby to generate heat, with a portion of said heat acting on the liquid in said liquid passages to heat the same for circulation through said engine, and the remaining portions of said heat being radiated to said engine, to said compartment and upwardly to said air intake manifold, and selectively operable air moving means for moving air through said air passages and into said space to heat said space.

3. A heating system for apparatus provided with an engine and a space to be heated, comprising a heater including means defining a combustion chamber and means defining an air heating chamber which at least partially surrounds said combustion chamber, means supporting said heater with said air heating chamber separating said combustion chamber from said engine, whereby heat is radiated to said engine directly through said air heating chamber when air is not being passed through said air heating chamber, and means including selectively operable air moving means for passing air through said air heating chamber and for discharging said air into said space, thereby to heat said space and to decrease the radiation of heat to said engine.

4. A heating system for a mobile craft provided with an engine and a space to be heated, comprising a heater including means defining a combustion chamber, a member partially surrounding said combustion chamber and supporting said heater upon said engine with said combustion chamber spaced from said engine, said member defining an air heating chamber which at least partially surrounds said combustion chamber and includes the space between said combustion chamber and said engine, whereby heat is radiated to said engine directly through said air heating chamber when air is not being pulled into said air heating chamber, said member also having openings for admitting air to said air heating chamber, and means including selectively operable air moving means for pulling air into said air heating chamber through said openings and for discharging the air into said space, thereby to heat said space and to decrease the radiation of heat to said engine.

5. A heating system for apparatus provided with a space to be heated and an engine having an intake manifold; comprising a heater including means defining a combustion chamber and means defining an air heating chamber which at least partially surrounds said combustion chamber, means supporting said heater in a position wherein said air heating chamber separates said combustion chamber from said engine and said combustion chamber is in heat exchange relationship with said intake manifold, whereby said intake manifold is heated and heat is radiated to said engine directly through said air heating chamber when air is not being passed through said air heating chamber, and means including selectively operable air moving means for passing air through said air heating chamber and for discharging said air into said space, thereby to heat said space and to decrease the radiation of heat to said intake manifold and said engine.

6. A heating system for a mobile craft provided with an engine and a passenger space to be heated, comprising a heater including means defining a combustion chamber and means defining an air heating chamber which at least partially surrounds said combustion chamber, means supporting said heater in a postion wherein said air heating chamber separates said combustion chamber from said engine, whereby heat is radiated to said engine directly through said air heating chamber when air is not being passed through said air heating chamber, duct means connecting said air heating chamber with said space, and selectively operable air moving means for passing air through said air heating chamber for discharging the air through said duct means into said passenger space, thereby to heat said space and to decrease the radiation of heat to said engine.

7. A heating system for apparatus provided with an engine having a liquid cooling system and a space to be heated, comprising a heater including means defining a combustion chamber and means defining an air heating chamber which at least partially surrounds said combustion chamber, means defining a liquid heating chamber fluid connected with said cooling system and arranged in heat exchange relationship with said combustion chamber, whereby cooling liquid in said cooling system may be circulated through said liquid heating chamber to receive heat from said combustion chamber, means supporting said heater in a position wherein said air heating chamber separates said combustion chamber from said engine, whereby heat is radiated to said engine directly through said air heating chamber when air is not being passed through said air heating chamber, and means including selectively operable air moving means for passing air through said air heating chamber and for discharging the air into said space, thereby to heat said space and to decrease the radiation of heat to said engine.

8. A heating system for a mobile craft provided with an engine having a liquid cooling system and a passenger space to be heated, comprising a heater including means defining a combustion chamber and means defining an air heating chamber which at least partially surrounds said combustion chamber, means defining a liquid heating chamber fluid connected with said cooling system and arranged in heat exchange relationship with said combustion chamber, whereby cooling liquid in said cooling system may be circulated through said liquid heating chamber to receive heat from said combustion chamber, means supporting said heater in a position wherein said air heating chamber separates said combustion chamber from said engine, whereby heat is radiated to said engine directly through said air heating chamber when air is not being passed through said air heating chamber, duct means connecting said air heating chamber with said space, and selectively operable air moving means for passing air through said air heating chamber and for discharging the air through said duct means to said passenger space, thereby to heat said space and to decrease the radiation of heat to said engine.

9. A heating system for a mobile craft provided with a passenger space to be heated and an engine having a liquid cooling system and an intake manifold; comprising a heater including means defining a combustion chamber and means defining an air heating chamber which at least partially surrounds said combustion chamber, means defining a liquid heating chamber fluid connected with said cooling system and arranged in heat exchange relationship with said combustion chamber, whereby cooling liquid in said cooling system may be circulated through said liquid heating chamber to receive heat from said combustion chamber, means supporting said heater in a position wherein said air heating chamber separates said combustion chamber from said engine and said combustion chamber is in heat exchange relationship with said intake manifold, whereby said intake manifold is heated and heat is radiated to said engine directly through said air heating chamber when air is not being passed through said air heating chamber, duct means connecting said air heating chamber with said passenger space, and selectively operable air moving means for passing air through said air heating chamber and for discharging the air through said duct means to said passenger space, thereby to heat said space and to decrease the radiation of heat to said intake manifold and engine.

HARRY B. HOLTHOUSE.